United States Patent [19]
Kitaura

[11] Patent Number: 5,520,377
[45] Date of Patent: May 28, 1996

[54] CLAMPING DEVICE

[75] Inventor: Ichiro Kitaura, Itami, Japan

[73] Assignee: Aioi Seiki, Inc., Hyogo-ken, Japan

[21] Appl. No.: 297,928

[22] Filed: Aug. 31, 1994

Related U.S. Application Data

[62] Division of Ser. No. 131,673, Oct. 5, 1993, Pat. No. 5,397, 114.

[30] Foreign Application Priority Data

Oct. 8, 1992 [JP] Japan .................................. 4-076805
Oct. 22, 1992 [JP] Japan .................................. 4-079854

[51] Int. Cl.$^6$ .................................................. B23Q 3/08
[52] U.S. Cl. ......................................................... 269/26
[58] Field of Search .............................. 269/20, 25, 26, 269/27, 32, 34, 91, 93, 94, 266, 99, 100, 101

[56] References Cited

U.S. PATENT DOCUMENTS

| | | | |
|---|---|---|---|
| 418,847 | 1/1890 | Liefer | 269/91 |
| 3,198,509 | 8/1965 | Sunderlage | 269/20 |
| 3,211,445 | 10/1965 | Rossman | 269/25 |
| 4,949,943 | 8/1990 | Bernstein | 269/32 |
| 5,160,124 | 11/1992 | Yamada et al. | 269/91 |

FOREIGN PATENT DOCUMENTS

| | | | |
|---|---|---|---|
| 48-44073 | 9/1946 | Japan . | |
| 52-30371 | 8/1977 | Japan . | |
| 58-54990 | 12/1983 | Japan . | |
| 894421 | 4/1962 | United Kingdom | 269/25 |

OTHER PUBLICATIONS

Western Electric, Techical Digest, "Workpiece Clamping Device", D. W. Savage, Apr. 1980.

*Primary Examiner*—Robert C. Watson
*Attorney, Agent, or Firm*—Evenson, McKeown, Edwards & Lenahan

[57] ABSTRACT

A clamping device for fixing a die on the setting surface of a lateral injection molding machine comprises a clamp main body, plural clamping hydraulic cylinders installed in the output portion at the front end portion of the clamp main body, and a guide mechanism for guiding the clamp main body movably only in the longitudinal direction without separate from the setting surface, in which the clamp main body can be freely changed over in position with respect to the setting surface in the released state, so that it may not be dislocated from the setting surface. The lower base portion of the clamp main body can be divided as a base member to be fixed on the setting surface.

8 Claims, 16 Drawing Sheets

CLAMPING DEVICE

This is a divisional of application Ser. No. 08/131,673, filed Oct. 5, 1993 now U.S. Pat. No. 5,397,114.

BACKGROUND OF THE INVENTION

The present invention relates to a clamping device for fixing a die or a work to be machined by a machine tool on a setting surface of a plate member such as bolster, platen and table.

As to the clamping device for clamping a die of injection molding machine or press machine on a platen or bolster, various clamping devices are presented for practical use as disclosed, for example, in the Japanese Laid-open Utility Model Publication No. 48-44073 and Japanese Patent Publication No. 52-30371.

Particularly, in a horizontal type injection molding machine, a pair of vertical platens is provided, and clamping devices for fixing the die on the setting surface of platen are disposed at both right and left areas of the setting surface.

When exchanging the dies, generally, an overhead traveling crane is used to replace the dies, and in this case, with supporting the die by the wire of the crane, and after releasing the clamping device, the clamping device is set aside on the setting surface, and the used die is lifted upward, and discharged. Then, a next die is lifted by the crane, and is lowered along the setting surface, and the clamping device is moved toward the die, and the die is fixed on the setting surface by the clamping device.

When the die size is changed by exchange of dies, moreover, the mounting position of the clamping device must be changed.

On the setting surface of a horizontal type injection molding machine, generally, any T-groove is not formed, but plural tap holes are formed in a specific layout pattern. Accordingly, as to the clamping device, it is preferable to apply a clamping device capable of being fixed on the setting surface through the tap holes and bolts, and being changed over the position in the state of being mounted on the setting surface.

For example, the clamping device disclosed in the Japanese Utility Model Publication No. 58-54990 is put in practical use. In this clamping device, a slit is formed in the clamp arm, and a fulcrum bolt penetrating through a bolt hole of a holding plate to be engaged with the upper end of the clamp arm and the slit in the clamp arm is screwed into the tap hole of the setting surface, and the rear end portion of the clamp arm is supported on the setting surface through a spacer and a bolt member. By tightening the fulcrum bolt, the die is fixed on the setting surface with the front end portion of the clamp arm.

In such injection molding machine or press machine, when exchanging the dies, the clamping device is once set aside and the old die is removed, and a new die is put in, then the clamping device is set at the clamping position for fixing the new die.

In the clamping device disclosed in the Japanese Patent Publication No. 52-30371, since the clamp main body is fixed on the setting surface with bolts, it takes a lot of time and labor for changing over the position of the clamping device. The clamping device disclosed in the Japanese Laid-open Utility Model Publication No. 48-44073 can not be mounted on the setting surface on which T-groove is not formed, such as the setting surface of the injection molding machine.

On the other hand, the clamping device disclosed in the Japanese Utility Model Publication No. 58-54990 can be mounted by utilizing the existing tap holes of the setting surface, and also can the changed over the position of the clamp arm by loosening the fulcrum bolt. In the releasing state, however, since the clamp arm and fulcrum bolt are not coupled at all, they tend to separate from each other, and their handling or storing may be troublesome.

This clamping device is light in weight, and is hence desirable for fixing the die on the vertical setting surface of the lateral injection molding machine, but since it cannot generate powerful clamping force, multiple clamping devices are needed, and it is difficult to improve the working efficiency of clamping and releasing, and parts may be dropped in releasing state, among other problems.

It is hence a primary object of the present invention to mount a clamping device on the setting surface by utilizing the existing tap holes of the setting surface, to simplify the position changeover operation of the clamping device, to improve the working efficiency of clamping and releasing, and to reinforce the clamping force.

SUMMARY OF THE INVENTION

The present invention presents a clamping device for fixing an object to be clamped on a setting surface of a plate member, and this clamping device comprises a clamp main body disposed on the setting surface, with its bottom abutting against the setting surface, a guide mechanism for guiding the clamp main body on the setting surface so as to be movable forward and backward in the longitudinal direction without separate from the setting surface, an output portion formed in a front end portion of the clamp main body, and confronting the setting surface across a gap for admitting an end portion of the object to be clamped, and plural hydraulic cylinders arranged in the output portion in one row in the direction orthogonal to the longitudinal direction, directed orthogonally to the setting surface, and capable of extending and driving piston rods toward the setting surface.

Alternatively, the clamping device comprises a base member like a thick plate being detachably fixed on a setting surface, a clamp main body disposed with its bottom abutting against the top surface of the base member, a guide mechanism for guiding the clamp main body on the base member so as to be movable forward and backward in the longitudinal direction without separating from the top surface of the base member, and plural hydraulic cylinders arranged in one row in the direction orthogonal to the longitudinal direction, installed orthogonally to the setting surface in an output portion provided in the front end portion of the clamp main body, and capable of extending and driving piston rods toward the setting surface.

DETAILED DESCRIPTION OF THE PREFERRED EMBODIMENTS

With reference to the drawings, the preferred embodiments of the present invention are described in detail below.

A first embodiment is an example of applying the present invention to a clamping device for fixing a die on a platen for fixing the die of a lateral injection molding machine.

Figure 1:
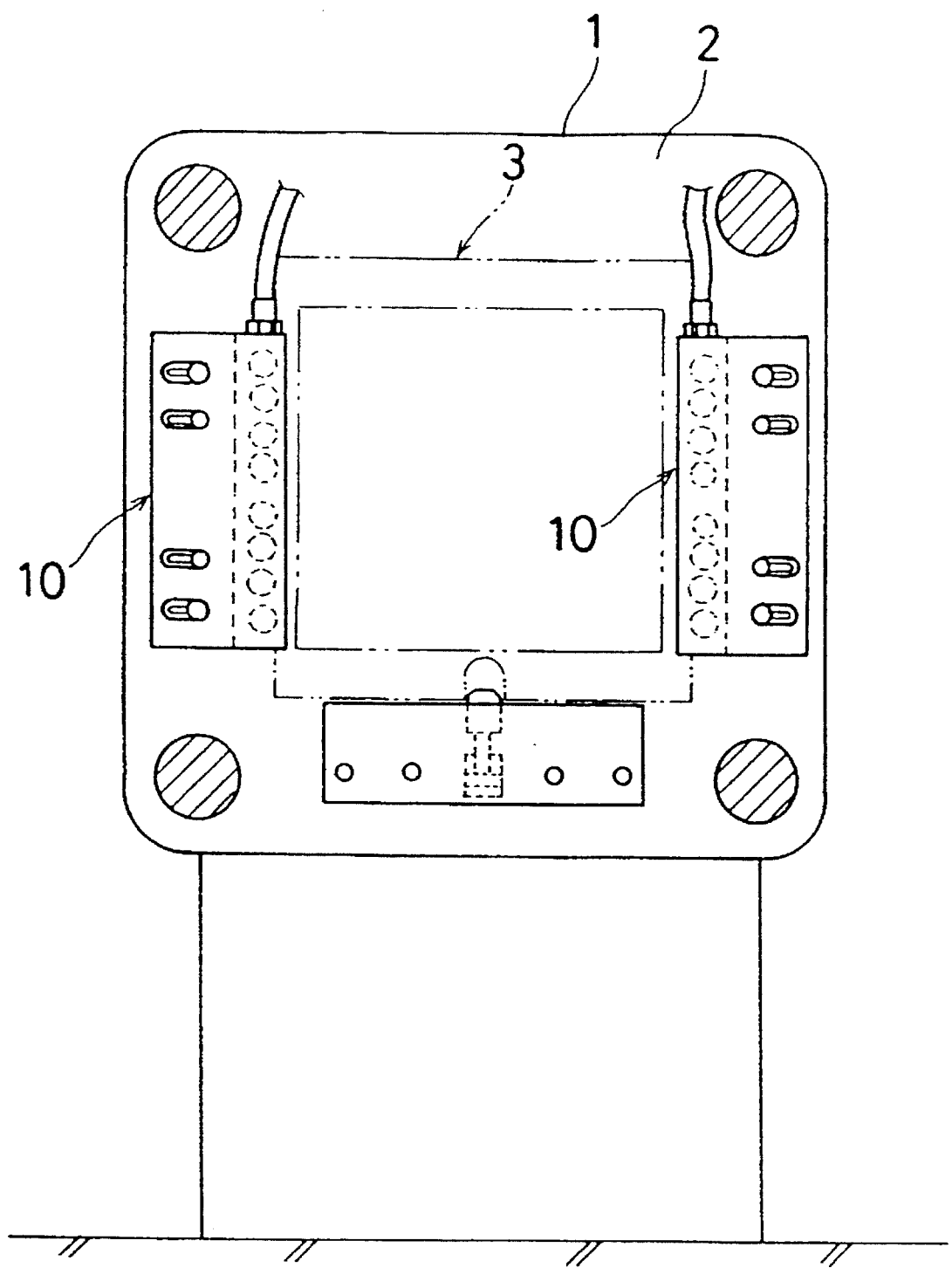
FIG. 1 is a diagram showing the state of fixing a die on a platen of a lateral injection molding machine by a clamping device according to an embodiment of the present invention.
Figure 2:
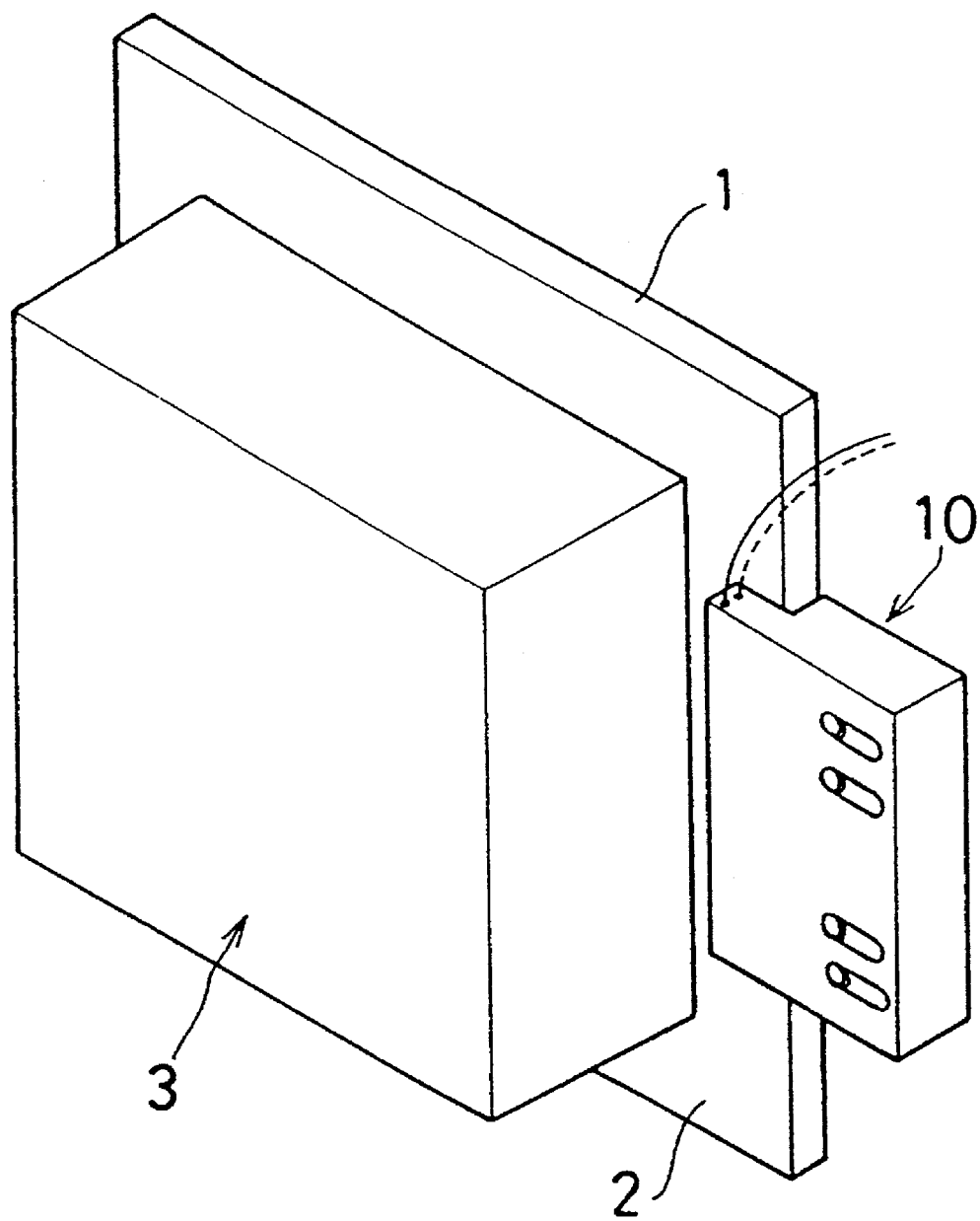
FIG. 2 is a perspective view of the die and clamping device in FIG. 1.

As shown in FIGS. 1, 2, a die 3 is disposed on each setting surface 2 of a pair of vertical platens 1 of the lateral injection molding machine, and each die 3 is fixed on the setting surface 2 by a pair of clamping devices 10.

Figure 3:
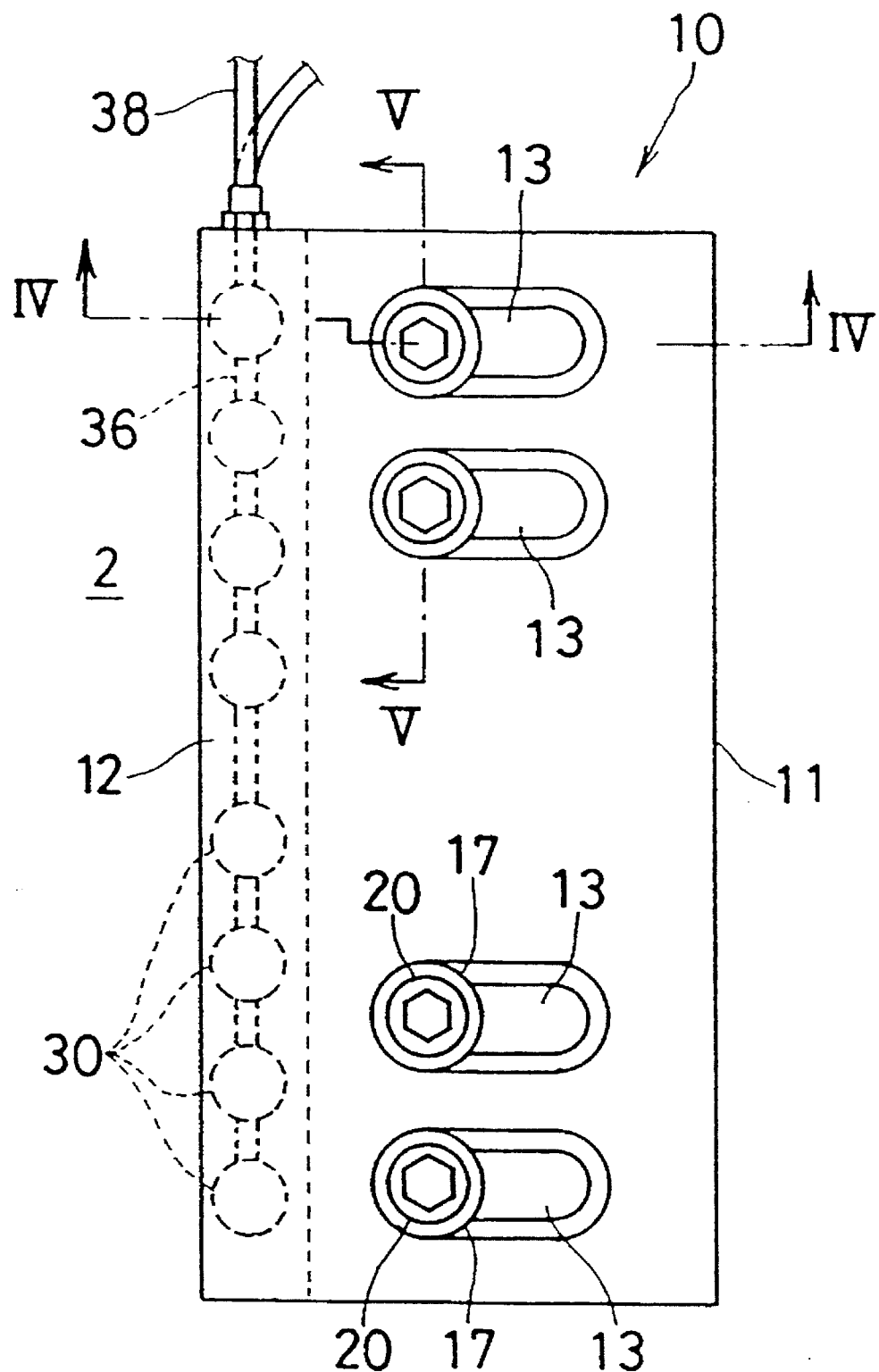
FIG. 3 is a side view of the clamping device in FIG. 1.

The structure of the clamping device 10 will be described with reference to FIGS. 3 to 5.

A clamp main body 11 is constituted with a slender rectangular thick metal member, and the clamp main body 11 is disposed on the setting surface 2 so that its entire bottom may contact with the setting surface 2. At the front end portion of the clamp main body 11 is formed an output portion 12 confronting the setting surface 2 across a specified gap for admitting the end portion 3a of the die 3.

Next, descriptions will be made on a guide mechanism for guiding the clamp main body 11 on the setting surface 2 so as to be movable forward and backward in the longitudinal direction without separating from the setting surface 2.

In the upper part and lower part of the clamp main body 11, in an intermediate part in the longitudinal direction of the clamp main body 11, four slender guide holes 13 are formed parallel in the longitudinal direction.

The guide holes 13 are formed in a T-shape with an open top end, and each guide hole 13 consists of a narrow hole 14 and a wide hole 15, and a step 16 is formed in the bottom of the wide hole 15.

In each guide hole 13, a flanged bush 17 consisting of a tubular part 18 and its top flange 19 is inserted, and the tubular part 18 is disposed in the narrow hole 14, and the flange 19 in the wide hole 15, and the tubular part 18 is formed slightly longer than the height of the narrow hole In each flanged bush 17, a bolt 20 is inserted from outward, and the bottom end portion of the bolt 20 is screwed into a tap hole 4 of the setting surface 2, and each flanged bush 17, is fixed on the setting surface 2 by a bolt 20 inserted into the flanged bush 17 and screwed in the tap hole 4 of the setting surface 2, with a slight gap left between the flange 19 and the step 16.

Thus, the guide mechanism comprises four guide holes 13, four flanged bushes 17, and four bolts 20.

Therefore, the clamp main body 11 is movable forward and backward in the longitudinal direction in the range allowed by the guide holes 13, but is arrested by the four flanges 19 of the four flanged bushes 17 so as not to separate from the settling surface 2. Meanwhile, each head 21 of the bolts 20 is put in the wide hole 15.

The output portion 12 comprises eight hydraulic cylinders 30 disposed in a row in the vertical direction, and directed to the direction orthogonal to the setting surface 2.

Concerning each hydraulic cylinder 30, a cylinder chamber is formed by closing the bottom of the cylinder hole formed in the clamp main body 11 by an annular member 31, and a piston 32 is put in the cylinder chamber, and a piston rod 33 extending from the piston 32 toward the setting surface 2 penetrates through a rod hole in the annular member 31, and the piston rod 33 is composed so as to advance from the output portion 12 toward the setting surface 2, whereas an oil chamber 34 is formed at the top side of the piston 32 in the cylinder chamber, and an air chamber 35 is formed at the opposite side of the piston 32.

In order to supply pressure oil to the oil chambers 34 in the eight hydraulic cylinders 30, an oil passage 36 is straightly formed to reach from a pressure oil feed port 37 at the upper end portion of the clamp main body 11 to the top of the eight oil chambers 34, and a hydraulic hose extended from a hydraulic feed unit (not shown) is connected to the pressure oil feed port 37.

In order to supply pressurized air into the air chambers 35 of the eight hydraulic cylinders 30, an air passage 41 is straightly formed to reach from an air feed port 39 at the upper end portion of the clamp main body 11 to the eight air chambers 35, and an air hose 40 extended from an pressurized air feed unit (not shown) is connected to the air feed port 39.

Alternatively, however, the air chambers 35 may be formed to be oil chambers, and pressure oil may be supplied thereinto, or a return spring may be provided in each air chamber 35 in order to return the piston 32 by the spring.

The function of the clamping device 10 will be described below.

Figure 4:
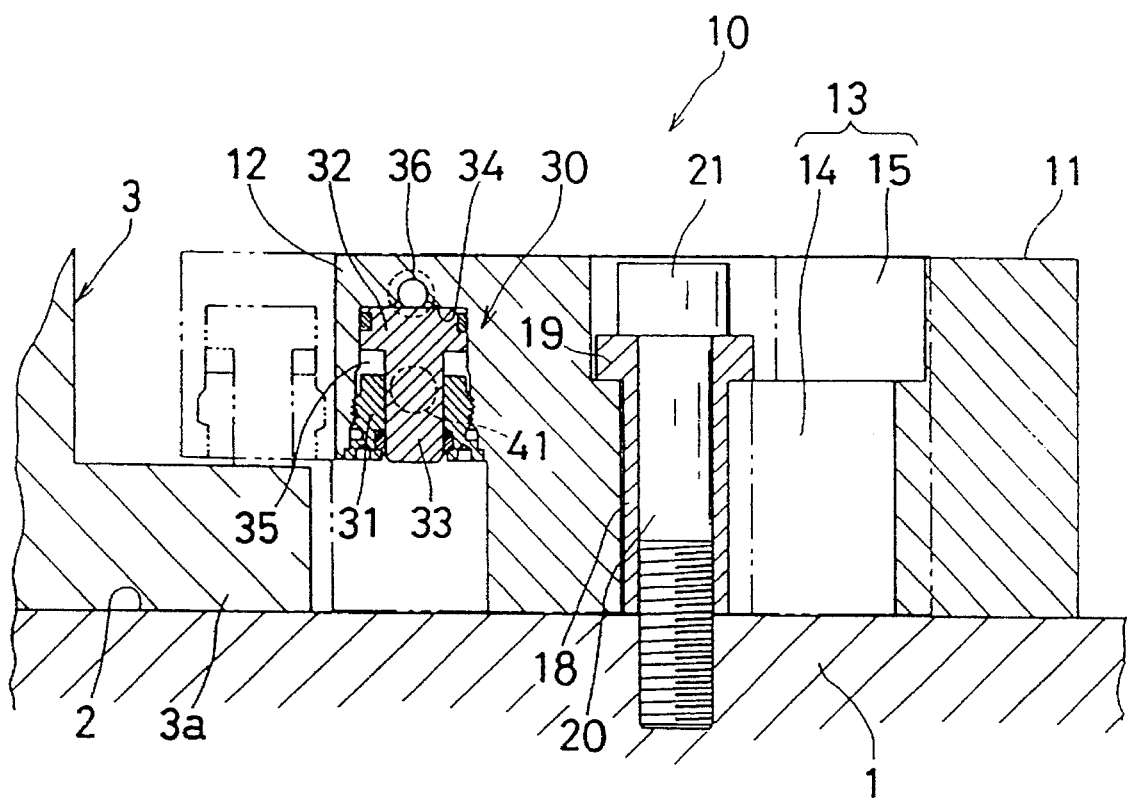
FIG. 4 is a sectional view of line IV—IV in FIG. 3.
Figure 5:
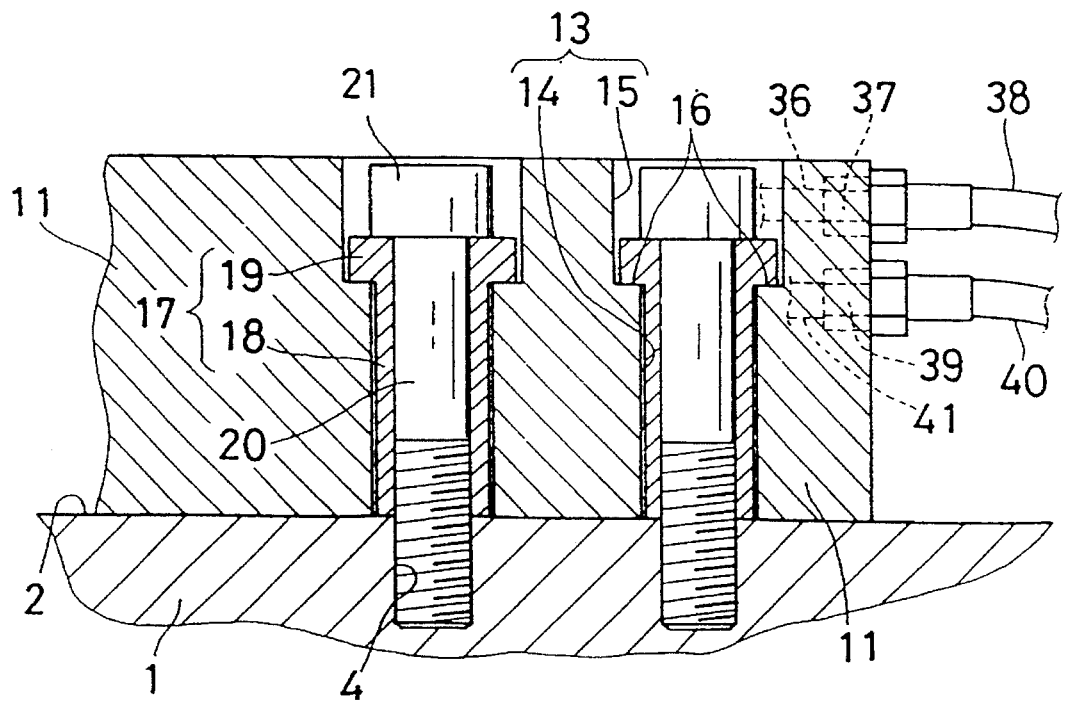
FIG. 5 is a sectional view of line V—V in FIG. 3.

In this clamping device 10, it is possible to mount the clamping device 10 on the setting surface 2 by making use of the four tap holes 4 of the setting surface 2, and in the released state, as shown in FIG. 4, it is possible to change over positions of the clamp main body 11 between the retreat position indicated by solid line and the clamping position indicated by chain line, so that the clamp main body 11 will not be dislocated from the setting surface 2.

By changing over the clamp main body 11 to the clamping position and feeding pressure oil to the eight hydraulic cylinders 30, the eight piston rods 33 advance to fix the end part 3a of the die 3 firmly to the setting surface 2. The clamping reaction force in this clamped state is powerfully supported by the four bolts 20 through the flanges 19 of the eight flanged bushes 17.

When exchanging the die 3, in the released state, the die 3 is replaced in the state of changing over the clamp main body 11 to the retreat position. After replacing the die 3, the clamp main body 11 to is changed again to the clamping position, and is set in the clamped state.

The clamp main body 11 can fix the dies 3 of various sizes because the position can be freely adjusted in the longitudinal direction as far as permitted by the guide holes 13. Besides, dies 3 of large and small sizes can be fixed by changing the mounting position for mounting the clamping device 10 on the setting surface 2.

Because of the constitution designed to clamp by eight hydraulic cylinders 30, clamping and releasing can be done easily.

The guide holes 13, flanged bushes 17, and bolts 20 are not limited to four sets, but two or more sets may be applicable, and the number of hydraulic cylinders 30 may be less or more than eight. Omitting the flanged bushes 17, it may be also composed to arrest the step 17 directly by the head 21 of the bolt 20.

Described below are seven modified embodiments including partial modification of the clamping device described above. The same elements as in the foregoing embodiment are identified with the same reference numerals, and duplicated explanations are omitted.

Figure 6:
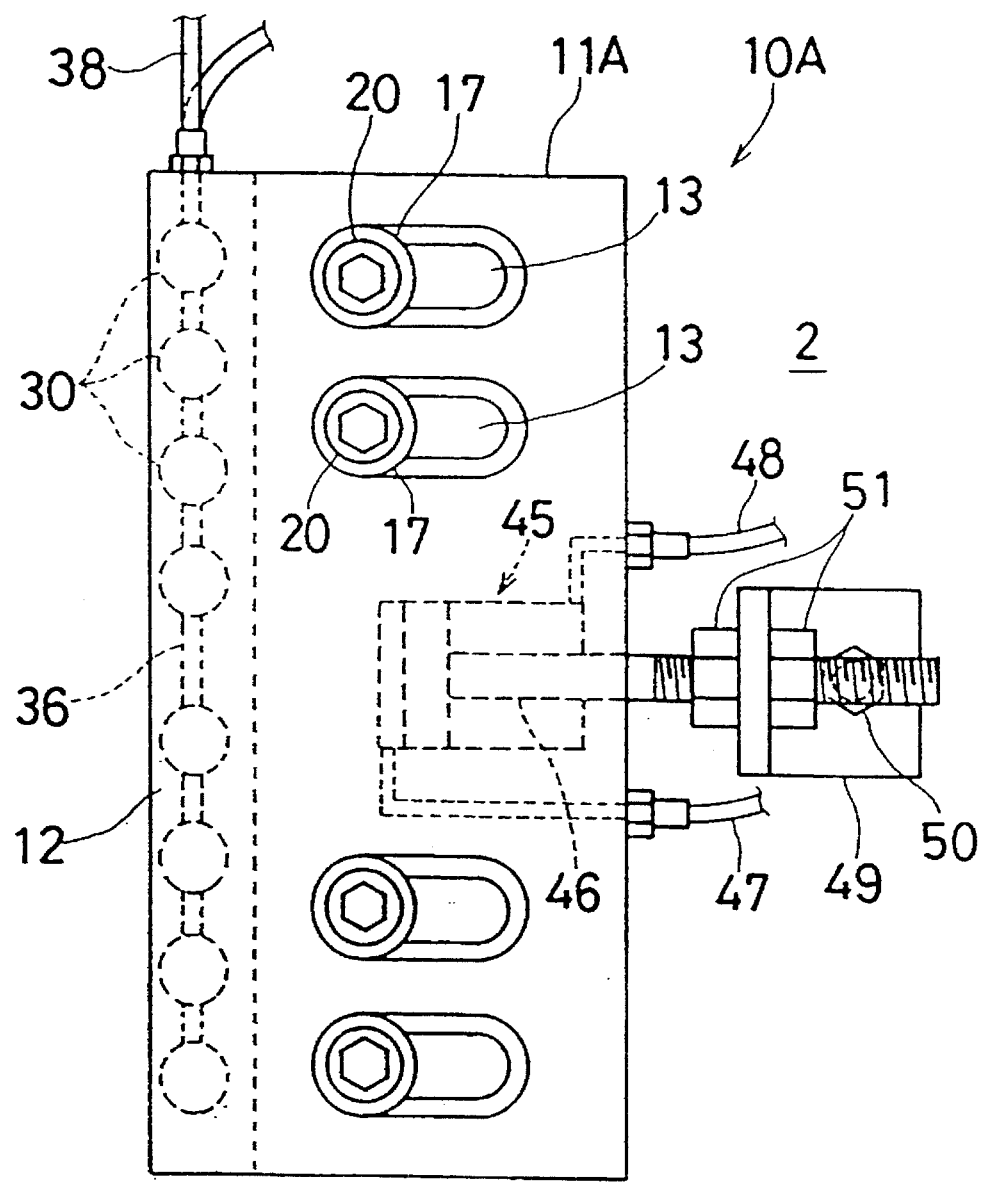
FIG. 6 is a side view of a clamping device in a first modified example.

I) As shown in FIG. 6, inside of the middle part of a clamp main body 11A of a clamping device 10A, a hydraulic cylinder 45 in the longitudinal direction are provided, and its piston rod 46 is projected backward from the rear end portion of the clamp main body 11A, and an L-shaped fixing piece 49 is fixed to the setting surface 2 with a bolt 50, and the piston rod 46 is coupled to the fixing piece 49 through a pair of nuts 51. Hydraulic hoses 47, 48 extended from an pressure oil feed unit (not shown) are connected to the hydraulic cylinder 45.

In the unclamped state, the clamp main body 11A may be moved in the longitudinal direction to change over the position by means of the hydraulic cylinder 45. In this constitution, clamping, releasing, and position changeover of clamping device 10A may be manipulated by remote control through the pressure oil feed unit. Instead of the hydraulic cylinder 45, an, air cylinder may be provided.

Figure 7:
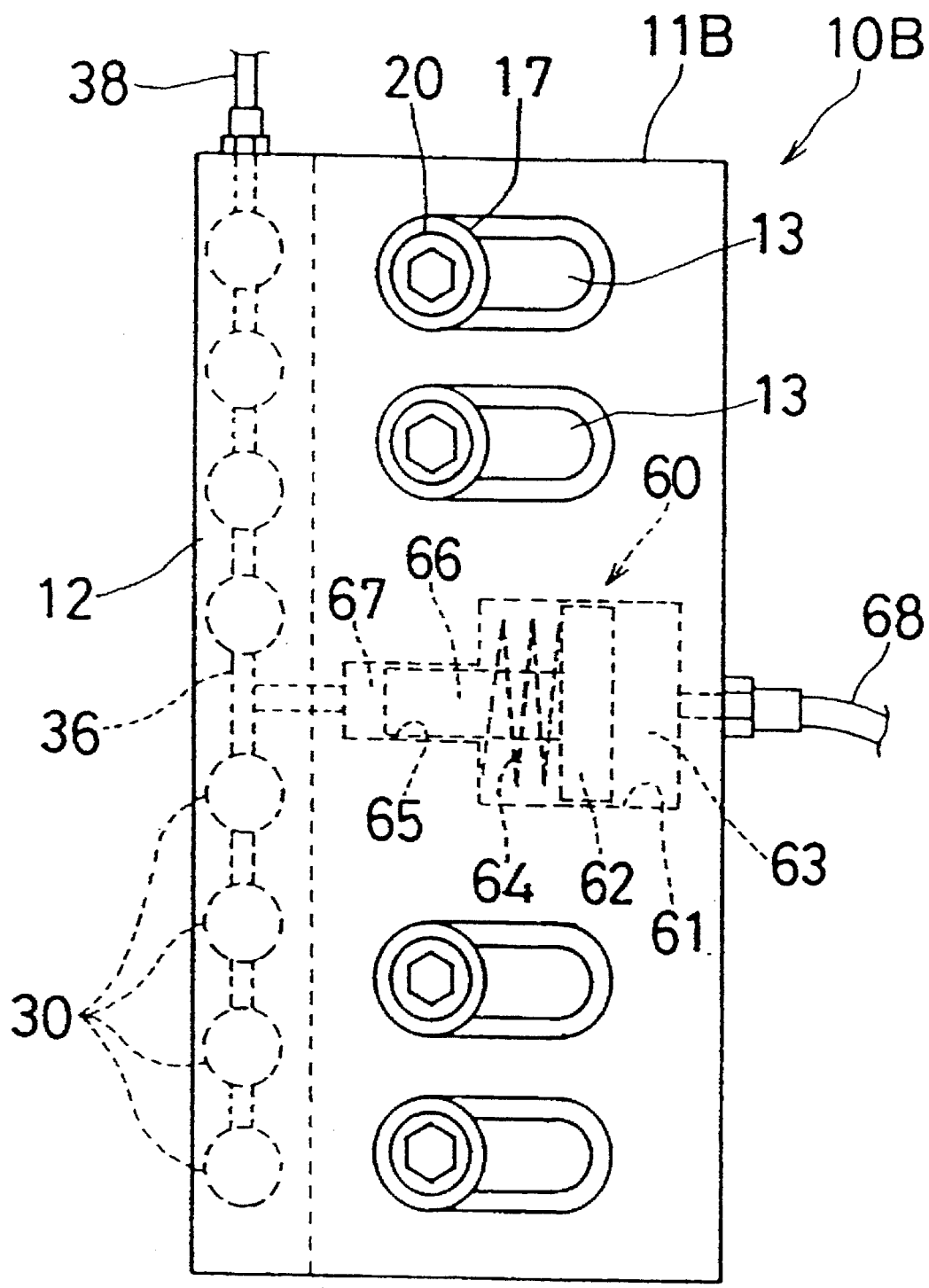
FIG. 7 is a side view of a clamping device in a second modified example.

II) As shown in FIG. 7, inside of the middle part of a clamp main body 11B of a clamping device 10B, a hydraulic booster 60 in the longitudinal direction are provided. The hydraulic booster 60 comprises a large bore cylinder 61, a piston 62 installed in the large bore cylinder 61, an oil chamber 63, a spring 64 installed in a spring chamber, a small plunger hole 65, a plunger 66 extended from the piston 62 and inserted into the small plunger hole 65, and a plunger chamber 67 connected to the oil passage 36. It is designed to feed pressure oil into the oil chamber 63 through a hydraulic hose 68 extended from an pressure oil feed unit (not shown).

In the state of changing over the clamp main body 11B in the clamping position, before feeding pressure oil into the oil chamber 63, when pressure oil is supplied into the eight hydraulic cylinders 30, pressure oil is supplied into the plunger chamber 67 from the oil passage 36. Next, by feeding pressure oil to the oil chamber 63, and when the piston 62 is driven forward, the pressure oil in the plunger chamber 67, oil passage 36, and oil chambers 34 in the eight hydraulic cylinders 30 is boosted, so that the clamping force may be fortified. However, in order to prevent counterflow of the pressure oil toward the hydraulic hose 38, a check valve or the like should be provided in the pressure oil feed unit for feeding pressure oil to the hydraulic hose 38. When the hydraulic booster 60 is provided, the clamping force can be extremely increased by raising the oil pressure in the hydraulic cylinder 30, or the hydraulic cylinder 30 may be reduced in size.

Instead of the hydraulic booster 60, a screw type hydraulic booster for pressurizing the oil by a screw member may be also provided.

Otherwise, when the plunger chamber 67 of the hydraulic booster 60 is formed in a large capacity, by omitting the hydraulic hose 38 and pressure oil feed port, it may be possible to feed pressure oil from the hydraulic booster 60 to the eight hydraulic cylinders 30.

Figure 8:
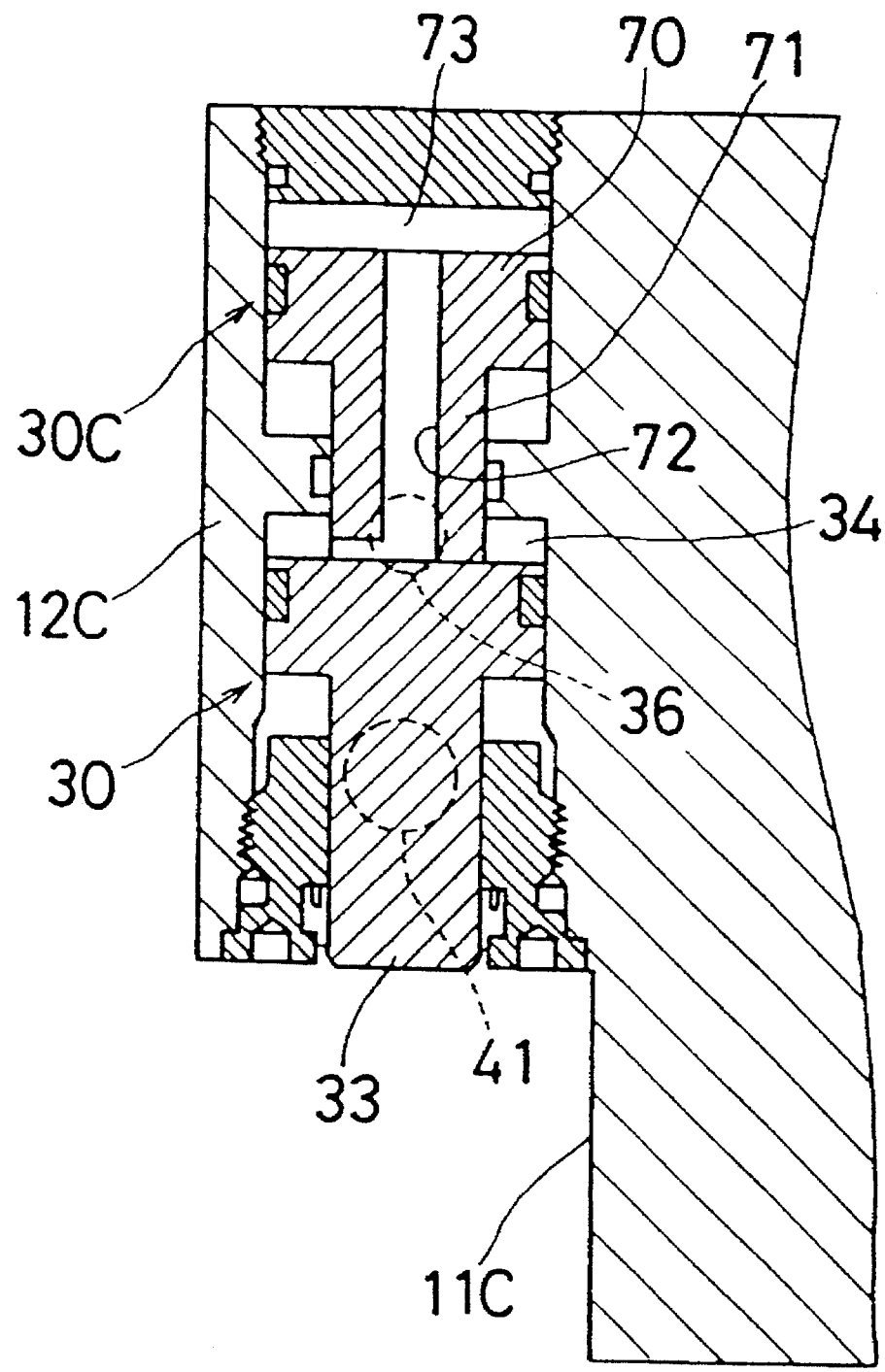
FIG. 8 is a sectional view of a part of a clamping device in a third modified example.

III) As shown in FIG. 8, when a clamp main body 11C is formed in a large thickness, eight sets of hydraulic cylinders in serial two-stage structure may be provided in an output portion 12C.

Auxiliary hydraulic cylinders 30C are provided in series at the top side of each hydraulic cylinder 30 approximately in the same structure as the hydraulic cylinder 30, and an oil chamber 34 communicates with an oil chamber 73 through an oil passage 73 formed in a piston 70 and a piston rod 71 of the auxiliary hydraulic cylinder 30C, and it is designed to drive by the pressure oil of the both hydraulic cylinders 30, 30C. Thus, the clamping force can be fortified.

Figure 9:
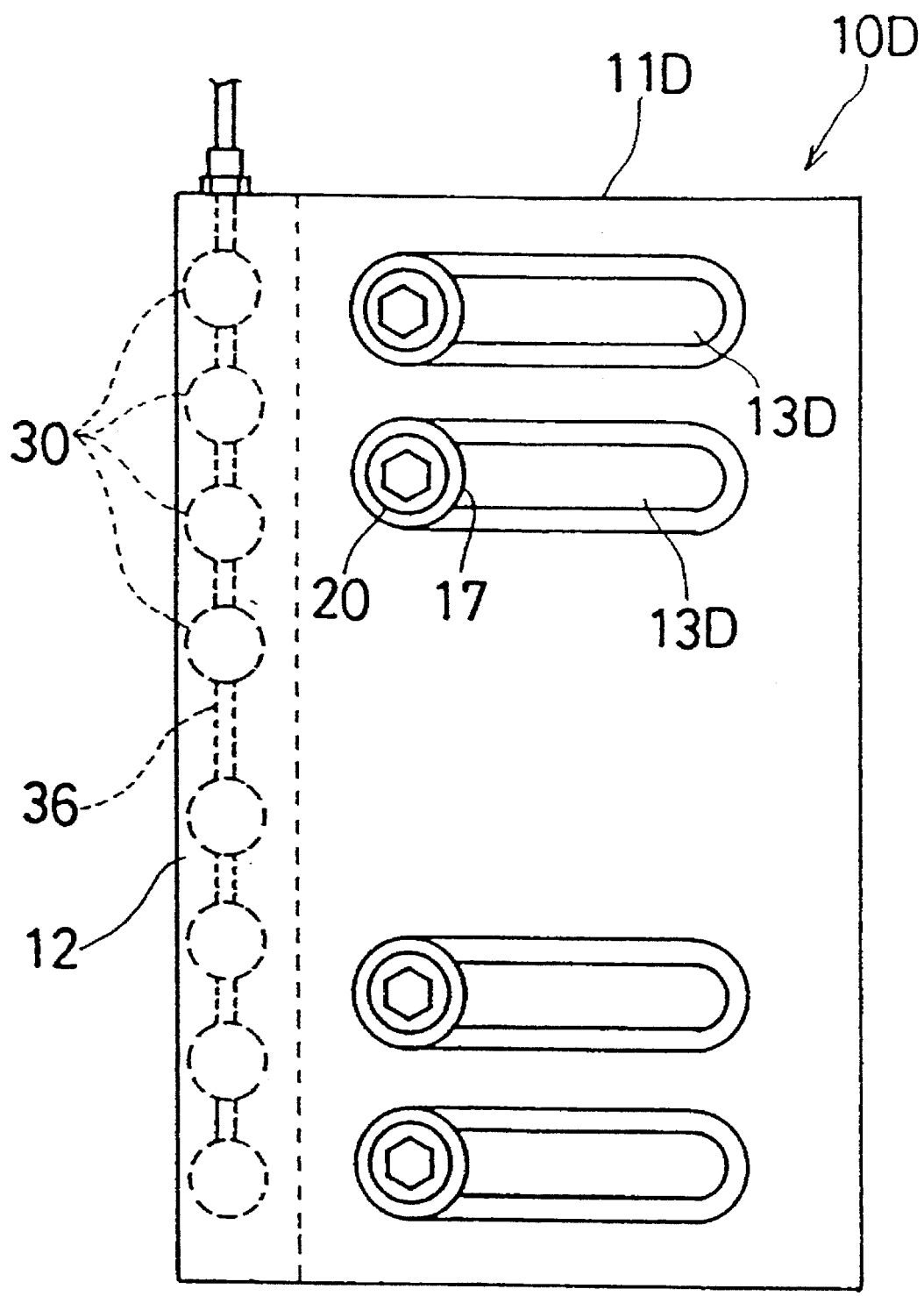
FIG. 9 is a side view of a clamping device in a fourth modified example.

IV) As shown in FIG. 9, the width in the longitudinal direction of a clamp main body 11D of a clamping device 10D is expanded, and the length of each guide hole 13D is extended. In this case, the position adjusting stroke of the clamping device 10D is large.

Figure 10:
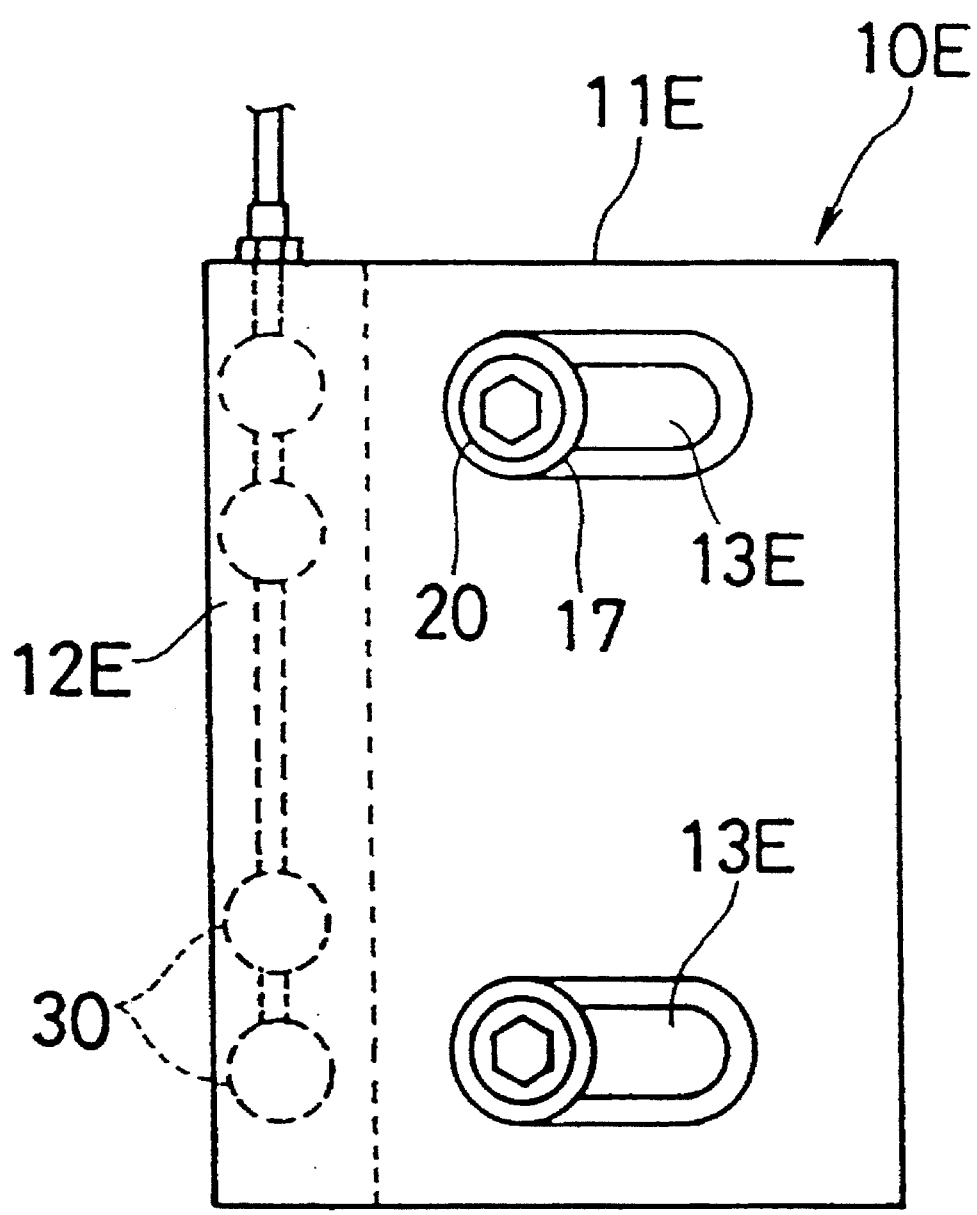
FIG. 10 is a side view of a clamping device in a fifth modified example.

V) As shown in FIG. 10, two relatively short guide holes 13E are formed in a clamp main body 11E of a clamping device 10E, and it is designed to mount the clamp main body 11E on the setting surface 2 through two flanged bushes 17 and two bolts 20, and four hydraulic cylinders 30 are provided in the output portion 12E.

Figure 11:
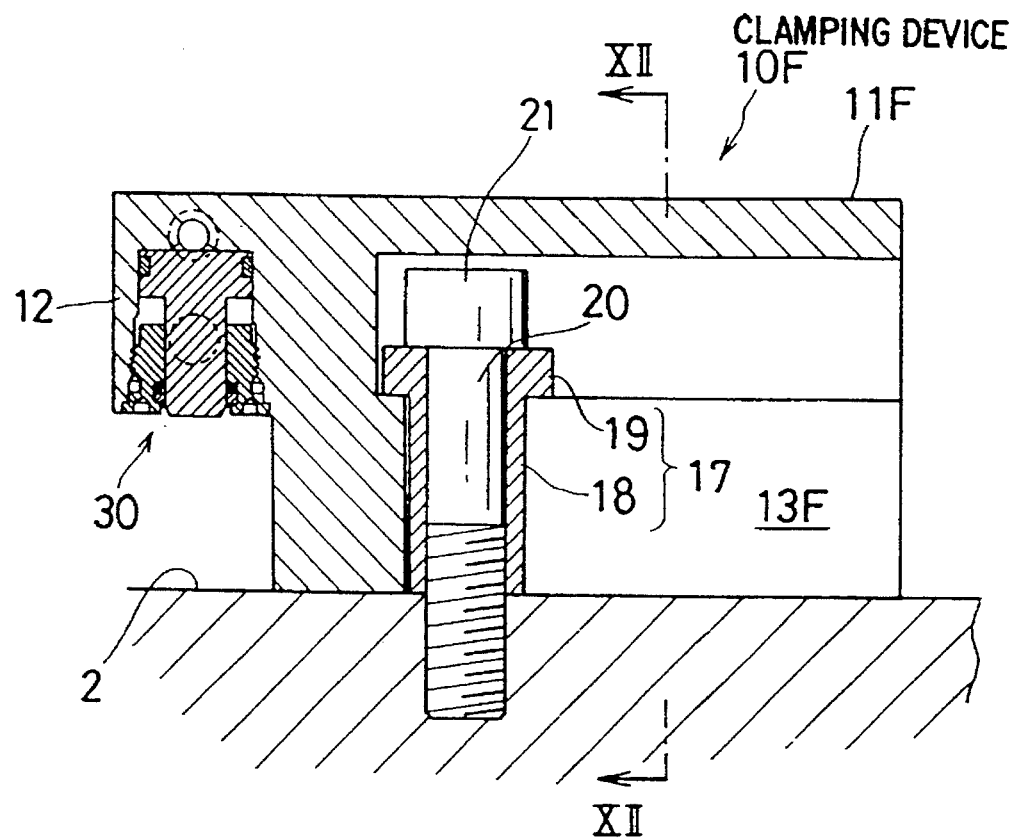
FIG. 11 is a sectional view of a part of a clamping device in a sixth modified example.
Figure 12:
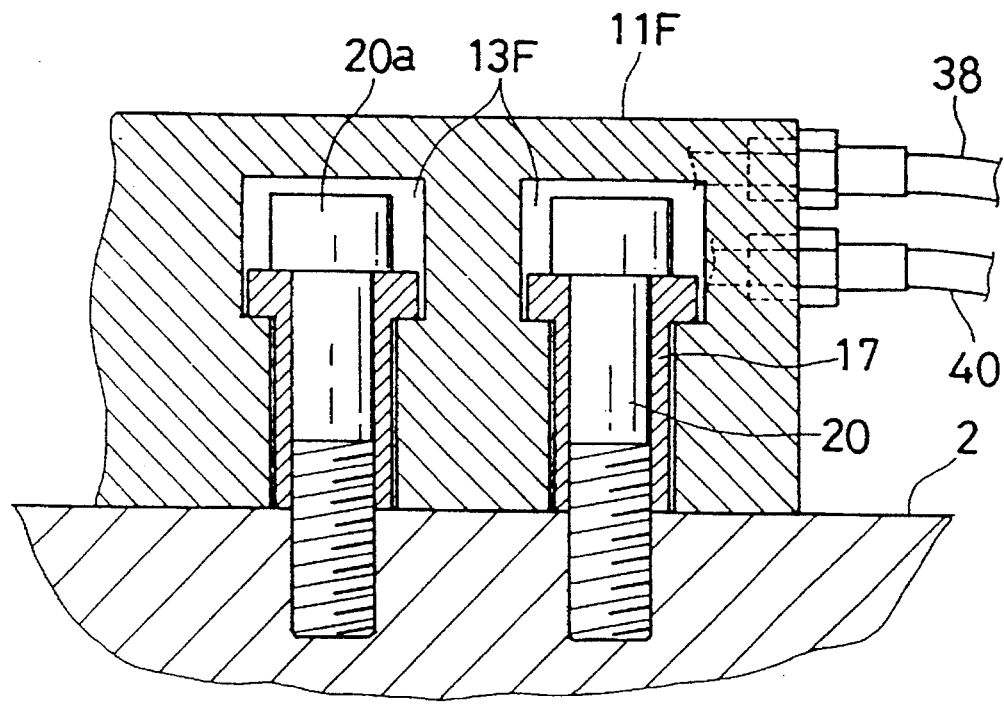
FIG. 12 is a sectional view of line XII—XII in FIG. 11.

VI) As shown in FIGS. 11, 12, each of plural guide holes 13F of a clamp main body 11F of a clamping device 10F is formed as a T section hole not opened to the top of the clam main body 11F, and is opened to the rear end portion (or front end portion)of the clamp main body 11F. In this clamping device 10F, after preliminarily fixing plural flanged bushes 17 on the setting surface 2 with bolts 20, by moving the clamp main body 11F from forward (or from backward), the flanged bushes 13F fixed with bolts 20 can be led into the guide holes 13F, respectively.

Since the outside of the guide holes 13F is not open, foreign matter will not invade easily into the guide holes 13F. Accordingly, the clamping device 10F is desirable for fixing a work to be machined by a machine tool. Incidentally, by omitting the flanged bushes 17, the step 16 may be directly stopped by the head of the bolt 20, or the rear end portion of the guide holes 13F may be closed with a detachable piece.

Figure 13:
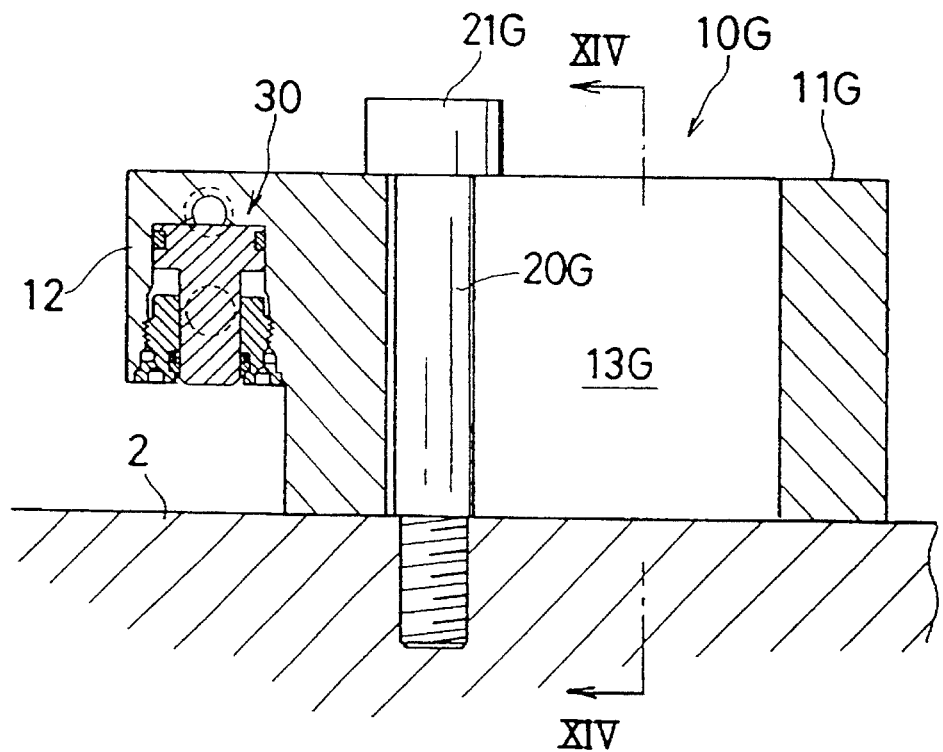
FIG. 13 is a sectional view of a part of a clamping device in a seventh modified example.
Figure 14:
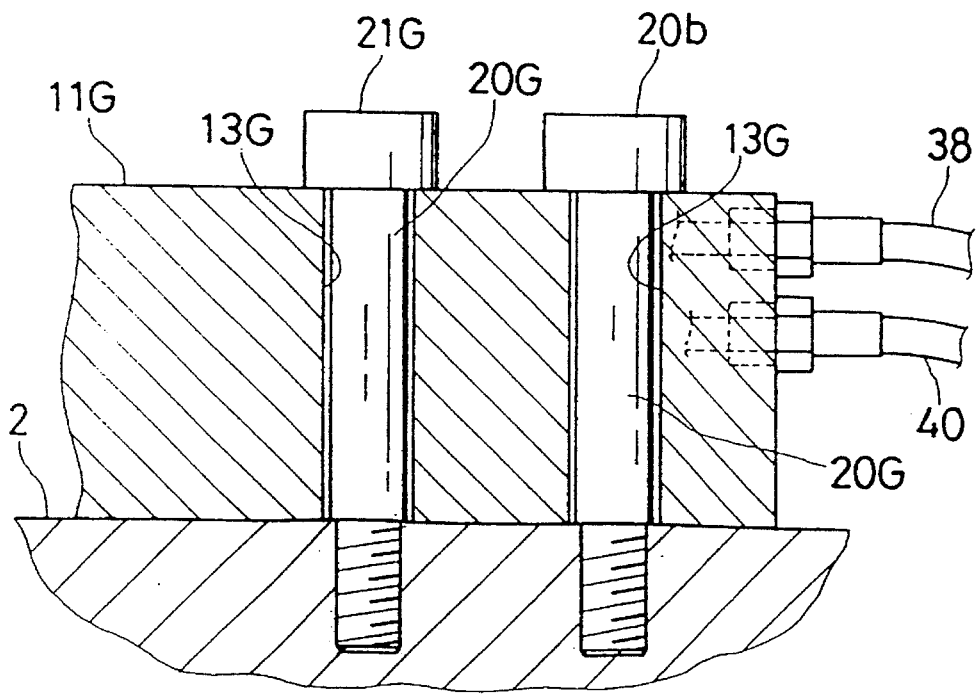
FIG. 14 is a sectional view of line XIV—XIV in FIG. 13.

VII) As shown in FIGS. 13, 14, plural rectangular section guide holes 13G are formed in a clamp main body 11G of a clamping device 10G instead of the guide holes 13, and the flanged bushes 17 are omitted, and each stepped bolt 20G inserted in the guide hole 13G is screwed into the tap hole 4 of the setting surface 2, and a slight gap is formed between the head 21G of each bolts 20G and the top end surface of the clamp main body 11G, and therefore the clamp main body 11G may be free to move longitudinally without separating from the setting surface, as being arrested by the heads 20G of the plural stepped bolts 20G.

In this clamping device 10G, the guide mechanism comprises plural guide holes 13G, and plural bolts 20G inserted into these plural guide holes 13G, respectively Therefore, in this clamping device 10G, since the structure of the guide holes 13G is simplified and the flanged bushes 17 are omitted, the entire structure is simplified, remarkably.

An alternative embodiment of the clamping device of the present invention will be described below with reference to FIG. 15 and the following FIGS.

Figure 15:
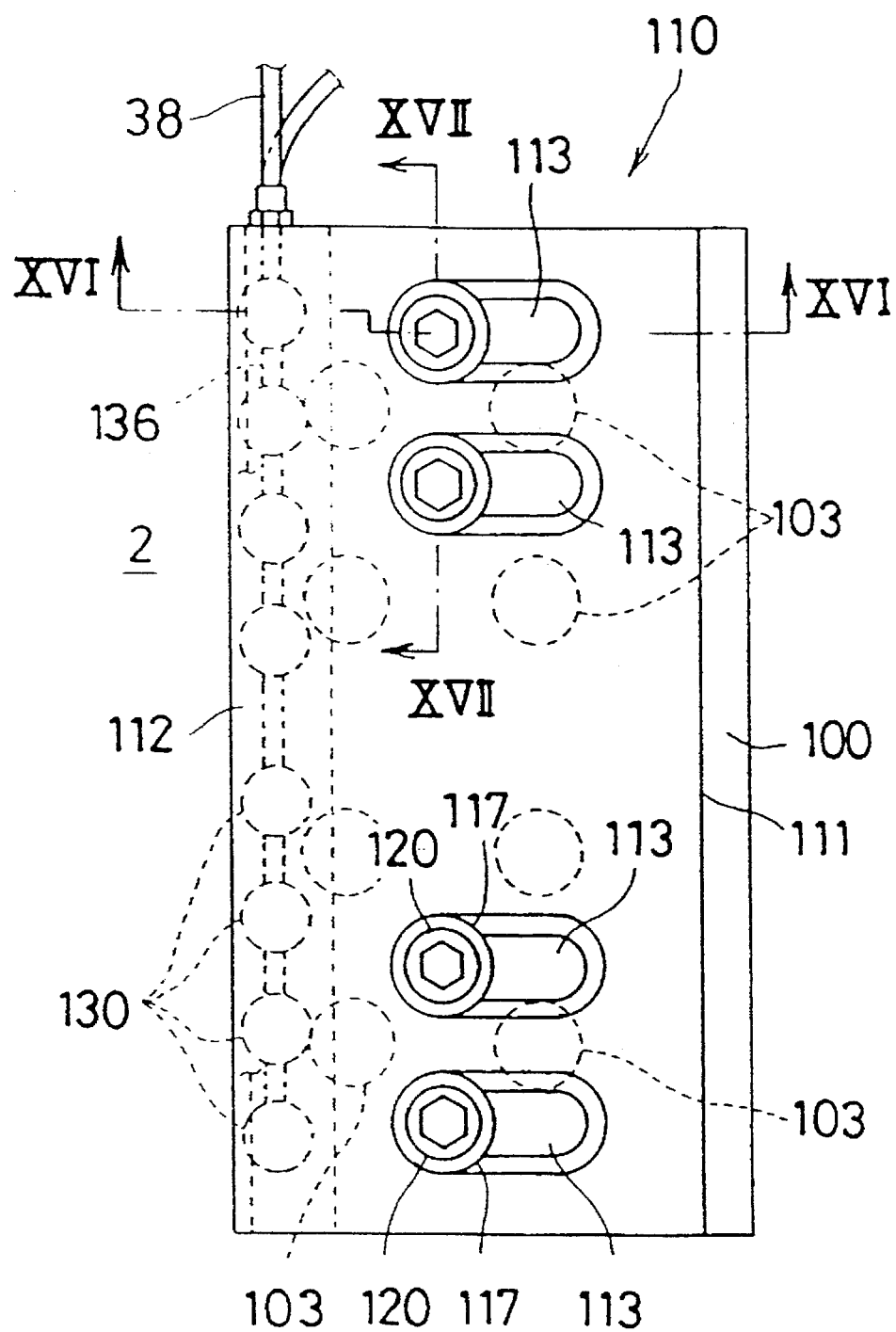
FIG. 15 is a side view of a clamping device in an alternative embodiment of the present invention.
Figure 16:
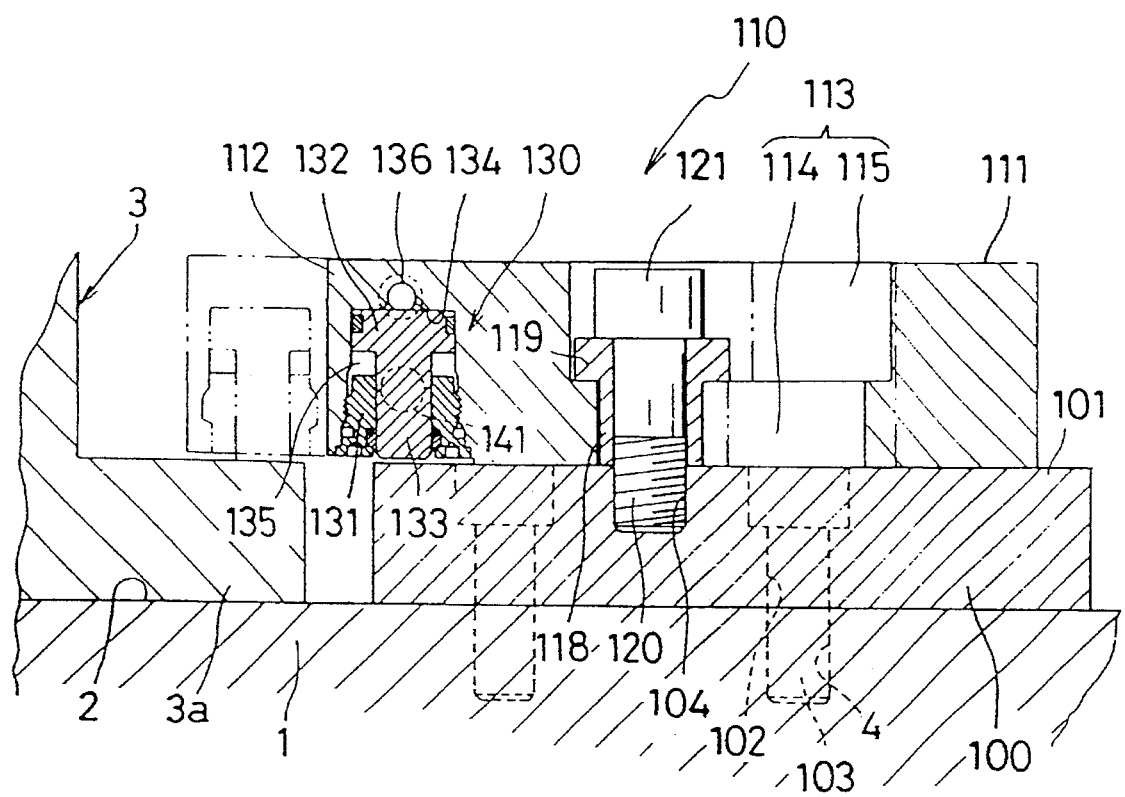
FIG. 16 is a sectional view of line XV—XV in FIG. 15.
Figure 17:
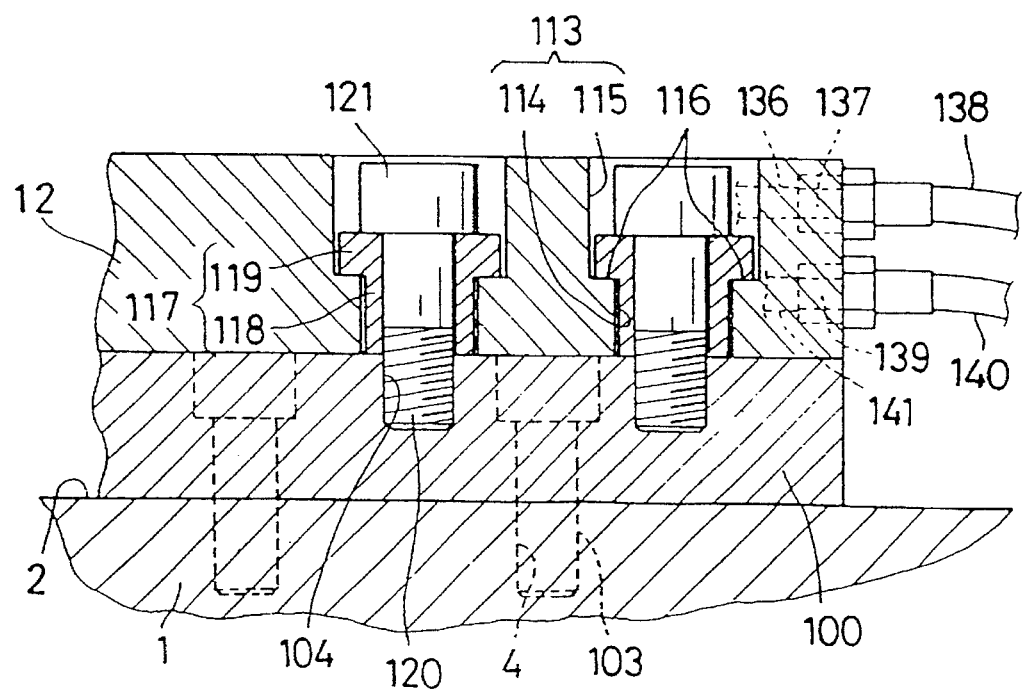
FIG. 17 is a sectional view of line XVII—XVII in FIG. 15.

As shown in FIGS. 15 to 17, in this clamping device 110, a base member 100 is constituted with a slender, rectangular thick metal member. In this base member 100, for example, eight bolt holes 102 are formed orthogonally to the setting surface 2 in an array pitch coincidental to the array pitch of the tap holes 4 in the setting surface 2, and the base member 100 is fixed detachably to the setting surface 2, with its bottom abutting against the setting surface 2, by screwing bolts 103 inserted into the eight bolt holes 102 into the tap holes 4 of the setting surface 2. A clamp main body 111 is constituted with a slender rectangular thick metal member in approximately same size as the base member 11 in vertical size and width size, and the clamp main body 111 is disposed on the base member 100 with its bottom in facial contact with the top surface 101 of the base member 100. At the front end portion of the clamp main body 111 is formed an output portion 112 confronting the setting surface 2 at a specific interval for admitting the end part 3a of the die 3.

Next, descriptions will be made on the guide mechanism for guiding the clamp main body 111 against the base member 100 so as to be movable forward and backward in the longitudinal direction and not to float from the base member 100.

This guide mechanism comprises, for example, four guide holes 113 respectively formed in the clamp main body 111, four flanged bushes 117 inserted in these guide holes 113 respectively, and four bolts 120 inserted in these bushes 117 respectively and screwed into the tap holes 104 of the base member 100.

More specifically, in the upper part and lower part of the clamp main body 111, in an intermediate part in the longitudinal direction of the clamp main body 111, four slender guide holes 113 are formed parallel in the longitudinal direction. Each guide holes 113 is formed in a T-shape with an open top end, and each guide hole 13 consists of a narrow hole 114 and a wide hole 115, and a step 116 is formed in the bottom of the wide hole 115.

In each guide hole 113, a flanged bush 117 consisting of a tubular part 118 and its top flange 119 is inserted, and the tubular part 118 is disposed in the narrow hole 114, and the flange 119 in the wide hole 115, and the tubular part 118 is formed slightly longer than the height of the narrow hole 114.

In each flanged bush 117, a bolt 120 is inserted from outward, and the bottom end portion of the bolt 120 is screwed into the tap hole 104 in the base member 100, and each flanged bush 117 is fixed to the base member 100, with a slight gap left between the flange 119 and the step 116, by means of the bolt 120.

Thus, the guide mechanism is constituted with four guide holes 113, four flanged bushes 117, and four bolts 120.

Therefore, the clamp main body 111 is movable forward and backward in the longitudinal direction in the range allowed by the guide mechanism, but is arrested by the four flanges 119 of the four flanged bushes 117 so as not to separate from the base member 100. The guide hole 113 is formed so that the output portion 112 may project ahead than the front end of the base member 100, when the clamp main body 111 advanced to the maximum limit.

The output portion 112 comprises eight hydraulic cylinders 130 disposed in a row in the vertical direction, directed in the direction orthogonal to the setting surface.

The constitution of annular member 131, piston 132, piston rod 133, oil chamber 134, and air chamber 135 in each hydraulic cylinder, the constitution of pressure oil feed port 137, oil passage 136, and hydraulic hose 138 for feeding pressure oil of the hydraulic cylinders 130 and the constitution of air feed port 139, air passage 141 and air hose 140 for feeding pressurized air to these hydraulic cylinders 130 are same as in the foregoing embodiment.

The function of the clamping device 110 will be described below. In this clamping device 110, the base member 100 is fixed to the setting surface 2 with eight bolts 103 by making use of eight tap holes 4 of the setting surface 2, and the clamp main body 111 is mounted on the base member 100 so as to be movable longitudinally and not to float from the top surface 101 of the base member 100 by the guide mechanism.

In the released state, as shown in FIG. 16, it is possible to change over positions of the clamp main body 111 between the retreat position indicated by solid lines and the clamping position indicated by chain lines, so that the clamp main body 111 will not be dislocated from the setting surface 2 by means of the base member 100 and guide mechanism.

By changing over the clamp main body 111 to the clamping position and feeding pressure oil to the eight hydraulic cylinders 130, the eight piston rods 133 advance to fix the end part 3a of the die 3 firmly to the setting surface 2. The clamp reaction force in this clamped state is powerfully supported by the base member 100 with eight bolts 120 through the flanges 119 of the eight flanged bushes 117.

When exchanging the die 3, in the released state, the die 3 is replaced in the state of changing over the clamp main body 111 to the retreat position. After replacing the die 3, the clamp main body 111 is changed again to the clamping position, and is set in the clamped state.

The clamp main body 111 can fix the dies 3 in various sizes because the position of the clamp main body 111 can be freely adjusted in the longitudinal direction as far as permitted by the guide mechanism. Besides, dies 3 of large and small sizes can be fixed by changing the mounting position for mounting the base member 100 on the setting surface 2.

Because of the constitution designed to clamp by eight hydraulic cylinders 130 which operate in synchronism, clamping and releasing can be done easily.

Moreover, since the clamp main body 111 complicated in structure, and the base member 100 simple in structure are separated from each other, machining of the clamp main body 111, especially machining of the guide holes 113 become easy, and the materials for the clamp main body 111 and base member 100 can be saved, so that the manufacturing cost of the clamping device 110 may be reduced.

The guide holes 113, flanged bushes 117, and bolts 120 are not limited to four sets, but two or more sets may be applicable, and the number of hydraulic cylinders 130 may be less or more than eight. By omitting the flanged bushes 117, it may be also composed to arrest the step 116 directly by the heads 121 of the bolts 120.

Described below are six modified embodiments including partial modification of the clamping device 110 described above. The same elements as in the foregoing embodiment are identified with the same reference numerals, and duplicated explanations are omitted.

I) Hydraulic cylinders similar to the hydraulic cylinder 45 in FIG. 6 may be provided in the clamp main body 111, and the clamp main body 111 may be driven by the hydraulic cylinder so as to be movable in the longitudinal direction to the setting surface 2.

II) A hydraulic booster similar to the hydraulic booster 60 in FIG. 7 may be provided in the clamp main body 111, and the pressure oil in the oil chambers 134 in eight hydraulic cylinders 130 may be boosted by the hydraulic booster, and pressure oil may be supplied into the eight oil chambers 134 by the hydraulic booster.

III) Same as in FIG. 8, eight sets of hydraulic cylinders in serial two-stage structure may be provided in the output portion 112 of the clamp main body 111.

Figure 18:
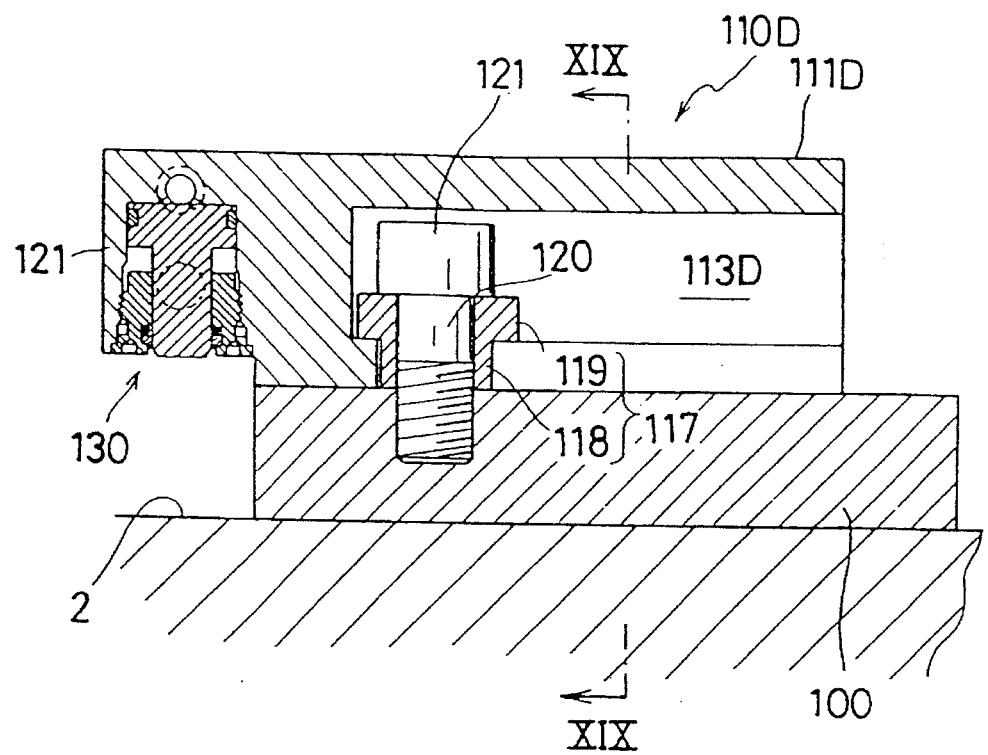
FIG. 18 is a sectional view of a clamping device in a fourth modified example of the alternative embodiment.
Figure 19:
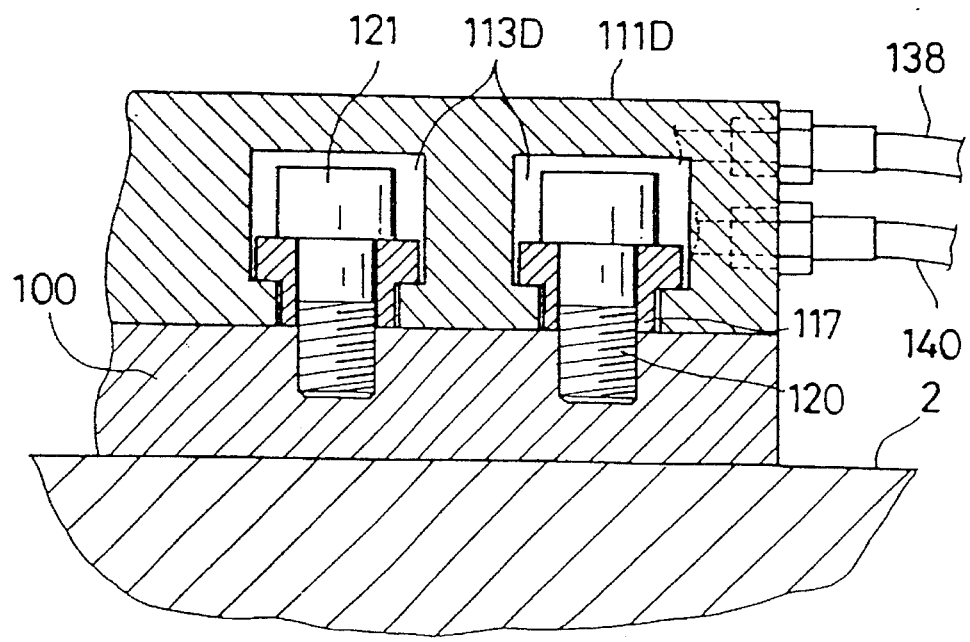
FIG. 19 is a sectional view of line XIX—XIX in FIG. 18.

IV) As shown in FIGS. 18, 19, the guide mechanism in a clamping device 110D is constituted with plural guide holes 113D, plural flanged bushes 117, and plural bolts 120.

Each of the plural guide holes 113D of the clamp main body 111D is formed as a T-section hole not opened to the top of the clamp main body 111D, and is opened to the rear end portion (or front end portion) of the clamp main body 111D.

In this clamping device 110D, after preliminarily fixing the plural flanged bushes 117 to the base member 100 by bolts 120, by moving the clamp main body 111D from forward (or from backward), the flanged bushes 117 fixed by the bolts 120 can be led into the guide holes 113D respectively. Since the outside of the guide holes 113D is not opened, foreign matter cannot invade the guide holes 113D. The base member 100 is detachably fixed on the setting surface 2 by means of plural bolts.

Therefore, the clamping device 110D is desirable for fixing a work to be machined by a machine tool. Or, by omitting the flanged bushes 117, the step 116 may be directly arrested by the head 121 of the bolt 120, or the rear end portion of the guide holes 113D may be closed by a detachable piece.

Figure 20:
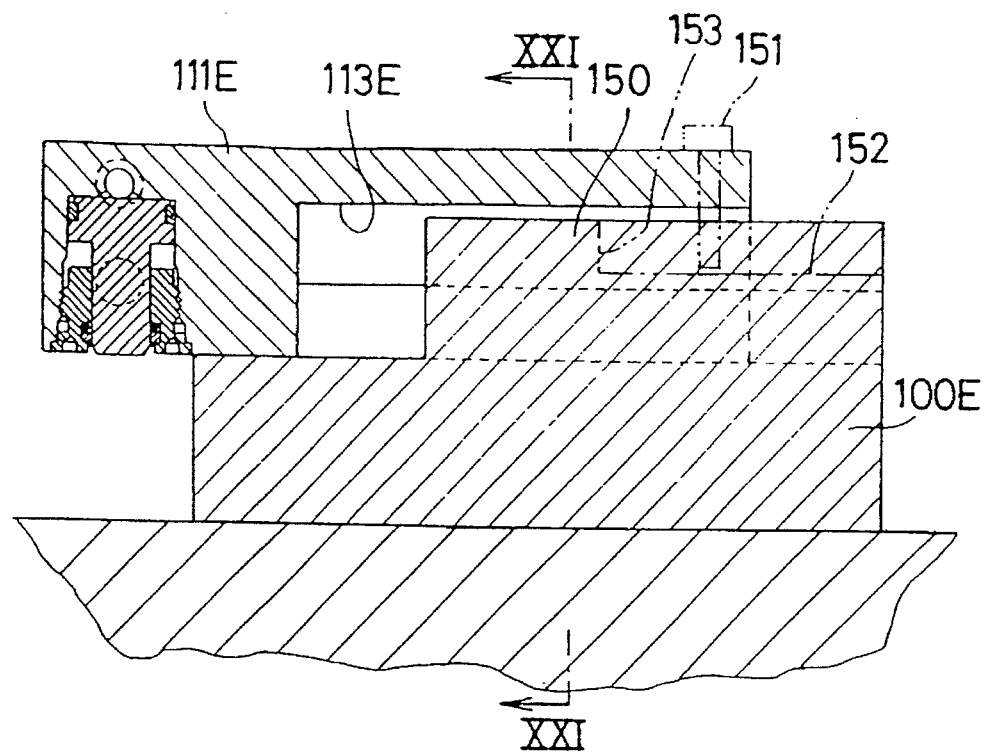
FIG. 20 is a sectional view of a clamping device in a fifth modified example of the alternative embodiment.
Figure 21:
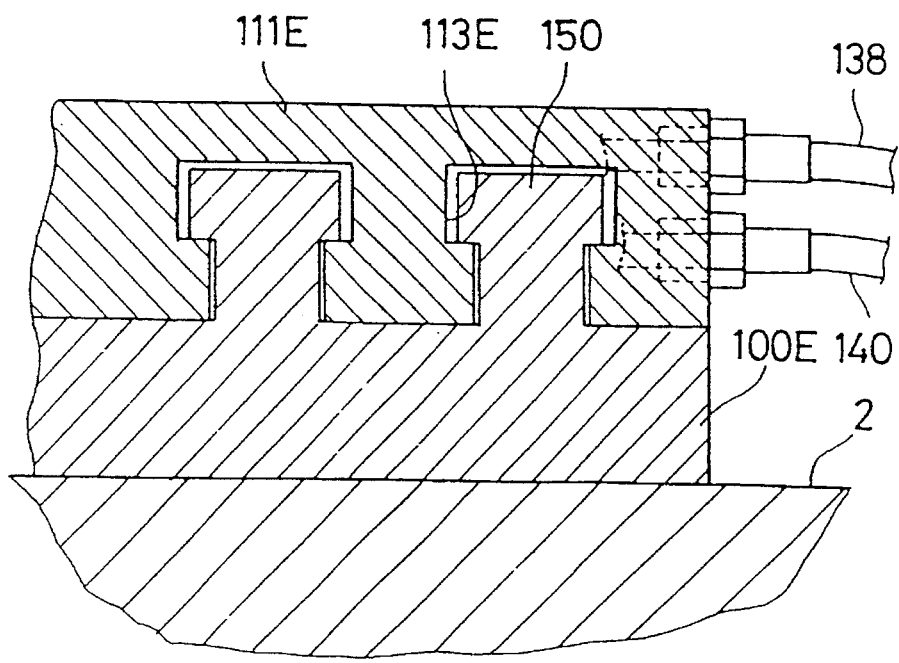
FIG. 21 is a sectional view of line XXI—XXI in FIG. 20.

V) As shown in FIGS. 20, 21, the guide mechanism of a clamping device 110E comprises plural T-grooves 113E formed in the clamp main body 111E in the longitudinal direction, and plural T-shaped engaging parts 140 formed on the top of the base member 100E and slidably engaged with the plural T-grooves 113E respectively while preventing the clamp main body 111E from floating up.

Since the rear ends of the T-grooves 113E are opened, to prevent dislocation of the clamp main body 111E forward from the base member 100E, for example, a pin member 151 is provided in the clamp main body 111E, and a longitudinal slender slit 152 is formed in the engaging parts 150, so that the pin member 151 may be arrested by the front end wall 153 of the slit 152. Or, by turning the guide mechanism upside down, the T-grooves 113E may be formed at the base member 100E side, and the engaging parts 150 may be formed at the clamp main body 111E side.

Figure 22:
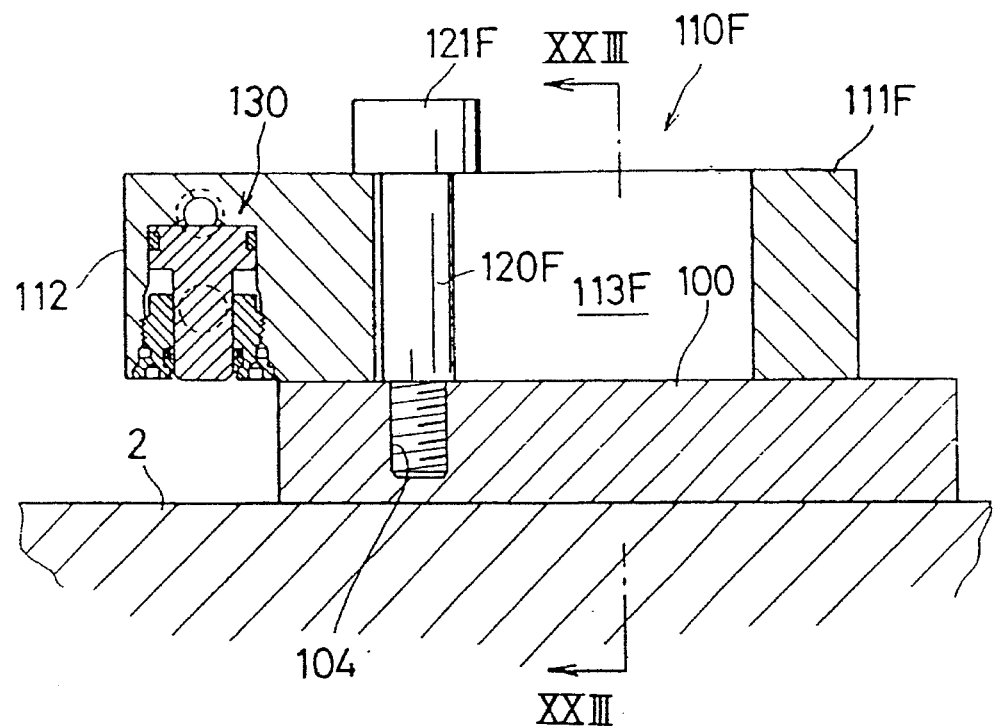
FIG. 22 is a sectional view of a clamping device in a sixth modified example of the alternative embodiment.
Figure 23:
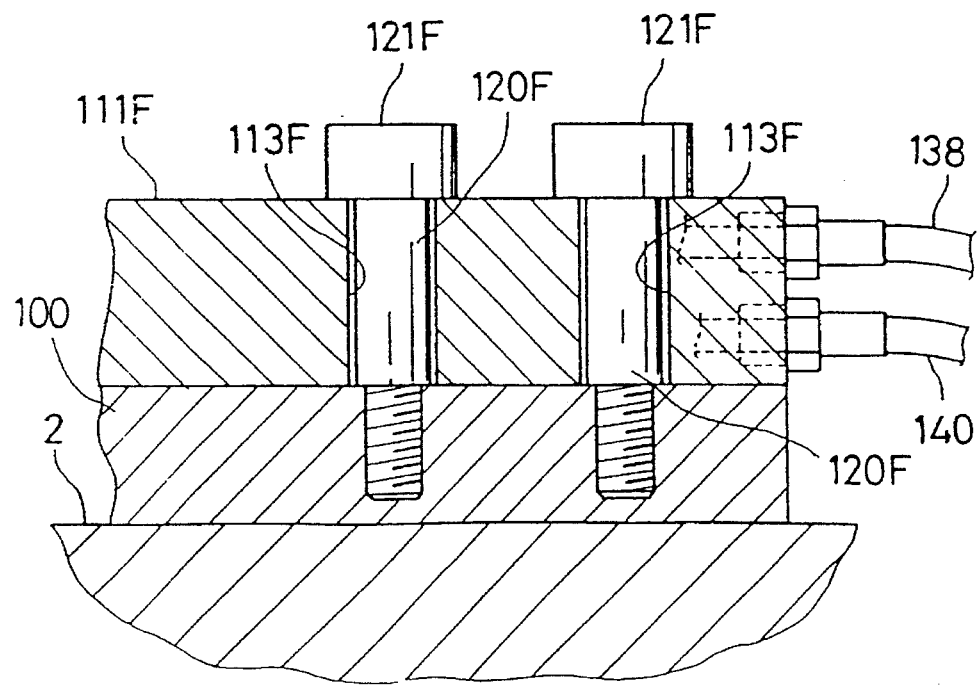
FIG. 23 is a sectional view of line XXIII—XXIII in FIG. 22.

VI) As shown in FIGS. 22, 23, the guide mechanism of a clamping device 110F is constituted with plural guide holes 113F, and plural bolts 120F being inserted respectively in these guide holes 113F, and bolts 120F are screwed to the base member 100.

In a clamp main body 111F of the clamping device 110F, plural rectangular section guide holes 113F are formed instead of the guide holes 113, and the flanged bushes 117 are omitted, and stepped bolts 120F inserted in the guide holes 113F are screwed into the tap holes 104 in the base member 100 respectively, and a slip gap is formed between the heads 121F of the bolts 120F and the clamp main body 111F, and the clamp main body 111F is guided so as to be movable in the longitudinal direction without floating from the base member 100, by the heads 121F of the plural stepped bolts 120.

In this clamping device 110F, the structure of the guide mechanism is simplified, and the flanged bushes can be omitted, so that the entire structure is simplified.

The clamping devices of the present invention described so far can be applied to fixing of not only the dies of injection molding machine but also the dies of press machine to the setting surface of the bolster, and fixing of the work to be machined by a machine tool to the setting surface of a table of the machine tool or the setting surface of a work pallet, and is applicable to fixing of various works, tools and other objects to be clamped to the setting surface of a plate member such as table, bolster and platen.

What is claimed is:

1. A clamping device for fixing an object to be clamped on a setting surface of a plate member such as a table, bolster and platen, said clamping device comprising:

a base member in a thick plate form being detachably fixed on the setting surface;

a clamp main body disposed with its bottom abutting against the top surface of the base member;

a guide mechanism formed in the clamp main body for guiding the clamp main body on the base member so as to be movable forward and backward in a longitudinal direction without separating from the top surface of the base member; and plural hydraulic cylinders arranged in one row in the direction orthogonal to the longitudinal direction, installed in an output portion provided in a front end portion of the clamp main body, directed in a direction orthogonal to the setting surface, and capable of extending and driving piston rods toward the setting surface.

2. A clamping device according to claim 1, wherein said base member includes tap holes, and the guide mechanism comprises:

plural guide holes formed in the clamp main body, extending widthwise in the longitudinal direction and lengthwise orthogonally to the setting surface, and disposed in parallel;

plural flanged bushes inserted in the plural guide holes respectively, and each of the flanged bushes including a flange for stopping the clamp main body; and plural bolts for fixing the flanged bushes to the top surface of the base member, being inserted into the plural flanged bushes respectively and screwed in said tap holes of the base member respectively.

3. A clamping device according to claim 2, wherein each of the plural guide holes is formed as a T-section hole having a step and being opened to the top of the clamp main body, and the step being constituted so as to be stopped by the flanged bush.

4. A clamping device according to claim 2, wherein:

each of the plural guide holes is formed as a T-section hole having a step said T-section hole being covered by the top of the clamp main body, and the step being constituted so as to be stopped by the flanged bush, and the plural guide holes extending widthwise so as to open toward one of a front end and a rear end of the clamp main body.

5. A clamping device according to claim 1, wherein the output portion comprises:

a pressure oil feed port;

pressure oil chambers for the plural hydraulic cylinders; and an oil passage for communicating between the pressure oil feed port and the pressure oil chambers of the plural hydraulic cylinders.

6. A clamping device according to claim 1, wherein said clamping device comprises a hydraulic cylinder directed in the longitudinal direction and provided in the clamp main body, for driving the clamp main body forward and backward.

7. A clamping device according to claim 5, wherein said clamping device comprises a hydraulic booster including a plunger hole communicating with the oil passage, a plunger inserted in the plunger hole, and a hydraulic cylinder for driving the plunger and provided in the clamp main body.

8. A clamping device according to claim 1, wherein the base mechanism has tap holes and wherein the guide mechanism comprises:

plural guide holes formed in the clamp main body, extending widthwise in the longitudinal direction and lengthwise orthogonally to the setting surface, and disposed in parallel; and plural bolt members inserted in the plural guide holes respectively, screwed into the tap holes of the base member.

* * * * *